(12) United States Patent
Kim

(10) Patent No.: US 11,562,558 B2
(45) Date of Patent: Jan. 24, 2023

(54) APPARATUS FOR PROVIDING LAUNDRY TREATING INFORMATION BASED ON ARTIFICIAL INTELLIGENCE

(71) Applicant: LG ELECTRONICS INC., Seoul (KR)

(72) Inventor: Dongin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 346 days.

(21) Appl. No.: 16/492,796

(22) PCT Filed: May 29, 2019

(86) PCT No.: PCT/KR2019/006438
§ 371 (c)(1),
(2) Date: Sep. 10, 2019

(87) PCT Pub. No.: WO2020/241919
PCT Pub. Date: Dec. 3, 2020

(65) Prior Publication Data
US 2021/0192206 A1    Jun. 24, 2021

(51) Int. Cl.
*G06V 20/00*  (2022.01)
*G06N 20/00*  (2019.01)
(Continued)

(52) U.S. Cl.
CPC ........... *G06V 20/00* (2022.01); *G06K 9/6256* (2013.01); *G06K 9/6279* (2013.01); *G06N 5/04* (2013.01); *G06N 20/00* (2019.01); *G06V 20/63* (2022.01)

(58) Field of Classification Search
CPC ............ G06K 9/00624; G06K 9/3258; G06K 9/6256; G06K 9/6279; G06N 20/00;
(Continued)

(56) References Cited

U.S. PATENT DOCUMENTS 10,572,760 B1 * 2/2020 Wu ....................... G06N 3/0454
11,144,923 B1 * 10/2021 Griffith ................ G06Q 20/123
(Continued)

FOREIGN PATENT DOCUMENTS

JP       2008-287525 A   11/2008
KR   10-2012-0036414 A    4/2012
(Continued)

*Primary Examiner* — Qun Shen
(74) *Attorney, Agent, or Firm* — Birch, Stewart, Kolasch & Birch, LLP

(57) ABSTRACT

A laundry data analysis apparatus based on artificial intelligence according to an embodiment of the present invention includes: a communication unit configured to receive an image including laundry data related to characteristics of laundry from an image acquisition device corresponding to a group including at least one member; and a processor configured to recognize the laundry data from the received image, acquire additional data related to the characteristics of the laundry on the basis of the recognized laundry data, store laundry information including the laundry data and the additional data into a database, and acquire member characteristic information of each of the at least one member from a plurality of laundry information corresponding to the group stored in the database.

9 Claims, 10 Drawing Sheets

(51) Int. Cl.
*G06K 9/62* (2022.01)
*G06N 5/04* (2006.01)
*G06V 20/62* (2022.01)

(58) Field of Classification Search
CPC .......... G06N 5/04; G06V 20/63; G06V 30/10; G06V 2201/09
See application file for complete search history.

(56) References Cited

U.S. PATENT DOCUMENTS

| | | | | |
|---|---|---|---|---|
| 2010/0153187 A1* | 6/2010 | Ghani | ................ | G06Q 30/0255 |
| | | | | 705/14.53 |
| 2015/0145671 A1* | 5/2015 | Cohen | .................... | G06K 19/07 |
| | | | | 340/539.11 |
| 2016/0267425 A1* | 9/2016 | Li | ....................... | G06Q 10/0631 |
| 2018/0060937 A1 | 3/2018 | Shu et al. | | |
| 2018/0066389 A1* | 3/2018 | Wu | ....................... | G05B 19/048 |
| 2018/0075329 A1* | 3/2018 | Anglin | ................ | G06F 16/9554 |
| 2018/0189970 A1* | 7/2018 | Balasu | .................. | H04N 7/185 |
| 2019/0169780 A1* | 6/2019 | Chen | ................. | G05B 13/0285 |
| 2021/0182287 A1* | 6/2021 | Agarwal | ................ | G06N 5/022 |

FOREIGN PATENT DOCUMENTS

| | | |
|---|---|---|
| KR | 10-2016-0028690 A | 3/2016 |
| KR | 10-2017-0125855 A | 11/2017 |

\* cited by examiner

FIG. 9

| data | PRODUCT NO. | COLOR | SIZE | MANUFACTURER | MATERIAL |
|---|---|---|---|---|---|
| 2018-11-01 | EJ4TC906 | BROWN | 55(M) | OLI | WOOL82% |
| 2018-11-01 | MDW1EE29 | CREAM | 75 | JD TEXTILE | COTTON 100% |
| 2018-11-02 | BF8621C01R | DEEP BLUE | 067 | SAM C&T | COTTON 97% |
| 2018-11-02 | PPBAI5501 | WHITE | 110 | WON | POLYESTER58% |
| 2018-11-02 | ZPY4PP1501 | NAVY | 86 | SHIN | COTTON 97% |
| 2018-11-10 | MDW1EE09 | BLUISH GREEN | 75 | JD TEXTILE | COTTON 100% |
| 2018-11-10 | MDW1EE29 | CREAM | 75 | JD TEXTILE | COTTON 100% |
| 2018-11-10 | ZPY4PP1501 | NAVY | 86 | SHIN | COTTON 97% |
| 2018-11-12 | BF8621C01R | DEEP BLUE | 067 | SAM C&T | COTTON 97% |
| 2018-11-12 | MDW1EE29 | CREAM | 75 | JD TEXTILE | COTTON 100% |
| ... | | | | | |
| 2018-11-30 | MDW1EE09 | BLUISH GREEN | 75 | JD TEXTILE | COTTON 100% |
| 2018-11-30 | PPBAI5501 | WHITE | 110 | WON | POLYESTER58% |
| 2018-11-30 | ZPY4PP1501 | NAVY | 86 | SHIN | COTTON 97% |

LAUNDRY_DATA

FIG. 10

ADD_DATA

| PRODUCT NO. | KIND | MANUFACTURER | BRAND | PRICE | AGE GROUP | SEX | DATE |
|---|---|---|---|---|---|---|---|
| EJ4TC906 | LONG COAT | OLI | EGO | 299,000 | 20s~40s | WOMEN | 2018-08 |
| MDW1EE29 | INNER WEAR | JD TEXTILE | ORGAN | 20,800 | INFANT | - | 2018-06 |
| MDW1EE09 | INNER WEAR | JD TEXTILE | ORGAN | 20,800 | INFANT | - | 2018-06 |
| BF8621C01R | PANTS | SAM C&T | POLE | 139,300 | 20s~40s | WOMEN | 2018-06 |
| PPBAI5501 | SHIRTS | WON | SG | 23,700 | 20s~30s | MEN | 2018-06 |
| ZPY4PP1501 | PANTS | SHIN | OLZ | 49,000 | 20s~40s | MEN | 2018-08 |

FIG. 11

MEMBER_INFO

| SEX | AGE GROUP | SIZE OF UPPER GARMENT | PREFERENCE BRAND | PRICE AVERAGE | WASH CYCLE |
|---|---|---|---|---|---|
| MEN | 20s~40s | 110 | OLZ, SG | 36,350 | TWO TIMES PER WEEK |
| WOMEN | 20s~40s | 55(M) | EGO, POLE | 219,150 | ONE TIME PER WEEK |
| - | INFANT | 75 | ORGAN | 20,800 | THREE TIMES PER WEEK |

APPARATUS FOR PROVIDING LAUNDRY TREATING INFORMATION BASED ON ARTIFICIAL INTELLIGENCE

CROSS REFERENCE TO RELATED APPLICATIONS

This application is the National Phase of PCT International Application No. PCT/KR2019/006438, filed on May 29, 2019, which is hereby expressly incorporated by reference into the present application.

FIELD

The present invention relates to a laundry data analysis apparatus based on artificial intelligence.

BACKGROUND

Artificial intelligence, which is a field of computer engineering and information technology that study a method of enabling a computer to perform thinking, learning, and self-development that can be achieved by human intelligence, means a technology that enables a computer to follow intelligent behaviors of human.

Artificial intelligence does not exist by itself, but is in directly and indirectly associated a lot with other fields of computer science. In particular, it is recently actively attempted to introduce artificial intelligent factors into various fields of an information technology and use the factors to solve problems in the fields.

Meanwhile, a technology that recognizes and learns situations using artificial intelligence and provides information, which a user wants, in a desired type or performs operations or functions that a user wants has been actively studied. Recognition models according to an artificial intelligence technology are grown up through updating by recognizing and learning new environments or the characteristics of users of artificial intelligence devices.

Meanwhile, as various devices or services based on artificial intelligence have been increasingly popularized, device manufacturers or service providers can acquire huge data related to device use or service use of users. Such device manufacturers or service providers can use the acquired data to improve products or services.

Meanwhile, such device manufacturers or service providers may consider plans for using the acquired huge data in business.

SUMMARY

An object of the present invention is to provide a laundry data analysis apparatus that can effectively acquire and manage information related to laundry.

Another object of the present invention is to provide a laundry data analysis apparatus that can infer characteristic information of members included in a group through acquired laundry information and can use the inferred characteristic information in various ways.

A laundry data analysis apparatus based on artificial intelligence according to an embodiment of the present invention includes: a communication unit configured to receive an image including laundry data related to characteristics of laundry from an image acquisition device corresponding to a group including at least one member; and a processor configured to recognize the laundry data from the received image, acquire additional data related to the characteristics of the laundry on the basis of the recognized laundry data, store laundry information including the laundry data and the additional data into a database, and acquire member characteristic information of each of the at least one member from a plurality of laundry information corresponding to the group stored in the database.

The laundry data analysis apparatus may further include a memory configured to store a laundry data recognition model, which is trained using a machine learning or deep learning algorithm, for recognizing the laundry data from the image.

The processor may input the image received from the image acquisition device as an input datum of the laundry data recognition model, acquire the laundry data recognized from the laundry data recognition model, and update the laundry data recognition model on the basis of the image and the recognized laundry data.

The image may include a tag attached to the laundry, and the processor may recognize the laundry data that are included in any one type of a text and a figure included in the tag.

The laundry data may include at least one of product number information, color information, size information, material information, manufacturer information, and manufacturing date information of the laundry.

The processor may control the communication unit to transmit the product number information included in the laundry data to a server, and receive the additional data about laundry corresponding to the product number information from the server through the communication unit.

The addition data may include at least one of kind information, brand information, selling price information, main age group information, sex information, and manufacturing date information of the laundry.

The processor may classify each of the plurality of laundry information corresponding to the group on the basis of at least one of size information, main age group information, and sex information, and discriminate at least one member included in the group on the basis of the classification result.

The processor may acquire the member characteristic information including at least one of sex, an age group, and a size of each of the at least one member on the basis of laundry information corresponding to each of the discriminated at least one member.

The member characteristic information may include at least one of a preference brand, an average price, and an average wash cycle of each of the at least one member included in the group.

The processor may infer a preference brand of each of the at least one member on the basis of the brand information of a plurality of corresponding laundry information for each of the at least one member.

The processor may infer an average price of laundry that each of the at least one member has on the basis of the selling price information of a plurality of corresponding laundry information, for each of the at least one member.

The processor may infer the average wash cycle information on the basis of a point in time when each of a plurality of corresponding laundry information is acquired, for each of the at least one member.

Depending on embodiments, the processor may generate wash course information on the basis of manufacturing date information of laundry information corresponding to a first member included in the group and an average wash cycle information of member characteristic information of the first member, and transmit the generated wash course information to a laundry treatment apparatus corresponding to the first member.

Depending on embodiments, the processor may transmit the member characteristic information to an external server to provide customized information based on the member characteristic information to a member included in the group.

BRIEF DESCRIPTION OF DRAWINGS

FIG. 9 shows an example of laundry data accumulatively acquired for a specific group by a laundry data analysis apparatus.

FIG. 10 shows an example of additional data that are acquired on the basis of laundry data by a laundry data analysis apparatus.

FIG. 11 shows an example of member characteristic information inferred on the basis of laundry information including acquired laundry data and additional data by a laundry data analysis apparatus.

DETAILED DESCRIPTION

Figure 1:
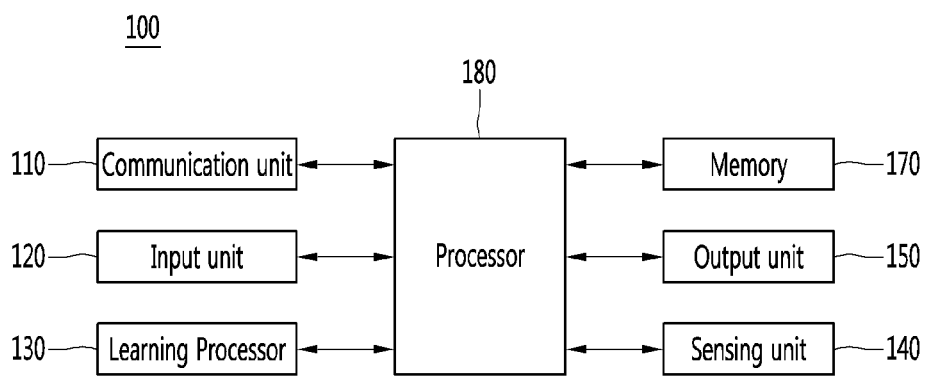
FIG. 1 shows an AI device according to an embodiment of the present invention.

Hereafter, embodiments of the present invention will be described in detail with reference to the accompanying drawings and the same or similar components are given the same reference numerals regardless of the numbers of figures and are not repeatedly described. Terms "module" and "unit" that are used for components in the following description are used only for the convenience of description without having discriminate meanings or functions. In the following description, if it is decided that the detailed description of known technologies related to the present invention makes the subject matter of the embodiments described herein unclear, the detailed description is omitted. The accompanying drawings are provided only for helping easily understand the embodiments described herein without limiting the technological spirit of the present invention and should be construed as including all modifications, equivalents, and replacements that are included in the spirit and scope of the present invention.

Terms including ordinal numbers such as 'first', 'second', etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
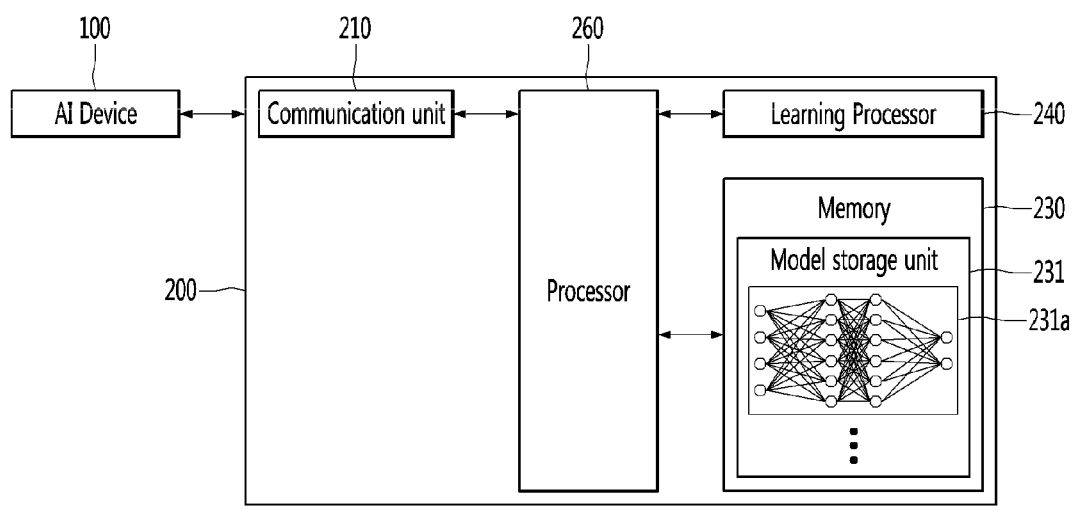
FIG. 2 shows an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
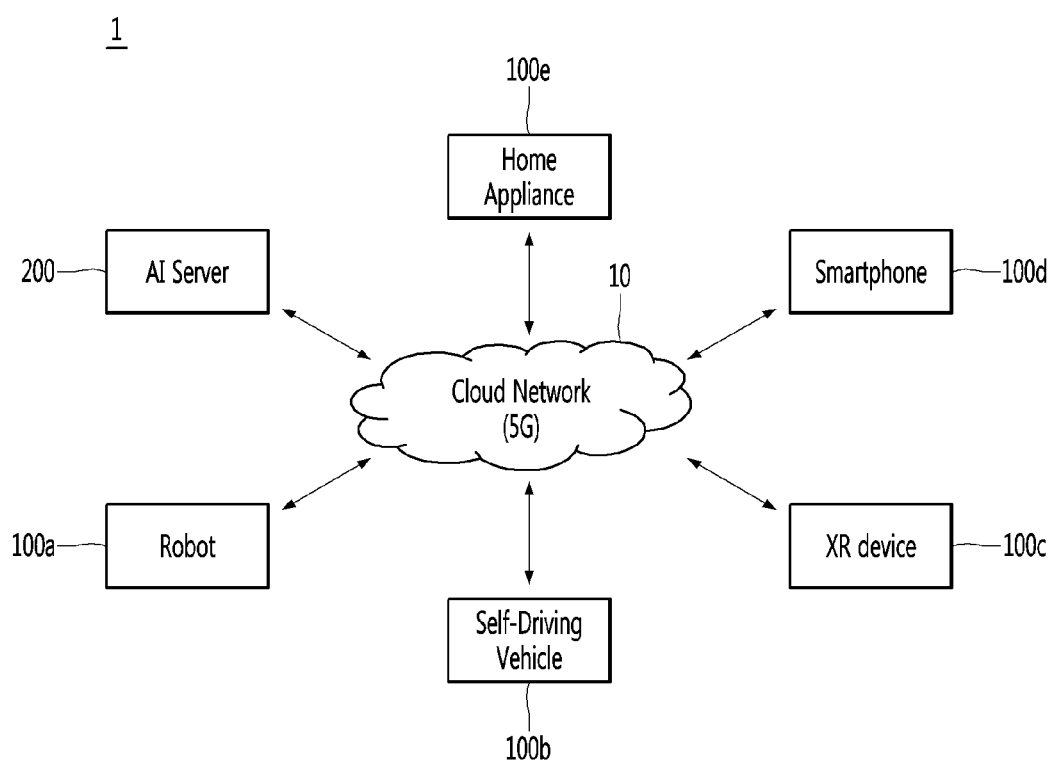
FIG. 3 shows an AI system according to an embodiment of the present invention.

FIG. 3 illustrates an AI system 1 according to an embodiment of the present invention.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the received input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
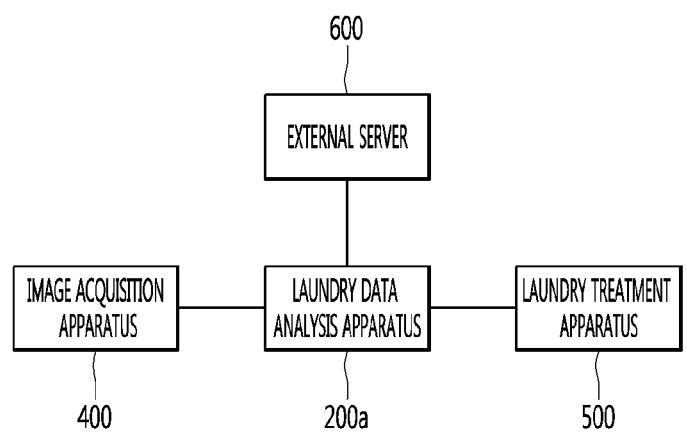
FIG. 4 is a laundry data analysis apparatus according to an embodiment of the present invention and a system including the laundry data analysis apparatus.

FIG. 4 is a laundry data analysis apparatus according to an embodiment of the present invention and a laundry data analysis system including the laundry data analysis apparatus.

Referring to FIG. 4, a laundry data analysis system may include a laundry data analysis apparatus 200*a*, an image acquisition apparatus 400, a laundry treatment apparatus 500, and an external server 600.

The laundry data analysis apparatus 200a may correspond to an example of the AI server 200 described with reference to FIG. 2. That is, the components 210, 230, 240, and 260 included in the AI server 200 of FIG. 1 may be similarly included in the laundry data analysis apparatus 200a.

The laundry data analysis apparatus 200a can recognize laundry data related to the characteristics of laundry from images acquired from the image acquisition apparatus 400 through a machine learning-based image recognition model (e.g., artificial neural network 231a) leaned by the learning processor 240.

For example, the artificial neural network 231a may include an artificial neural network (ANN) implemented by hardware, software, or a combination thereof. For example, the artificial neural network 231a may include a CNN (convolutional neural network) learned through deep learning, but is not limited thereto and may include various types of artificial neural networks.

Meanwhile, the image may include a tag image attached to laundry such as clothing. The tag may include a plurality of laundry data related to characteristics of laundry such as the product number, color, size, material, manufacturer, management method (directions for use etc.) of laundry. The image acquisition apparatus 400 can acquire the tag image and transmit the acquired tag image to the laundry data analysis apparatus 200a by operation of a user, etc.

The image acquisition apparatus 400 may include various apparatuses including a camera. For example, the image acquisition apparatus 400 may include a mobile terminal such as a smartphone and a tablet PC. Depending on embodiments, when the laundry treatment apparatus 500 is equipped with a camera, the image acquisition apparatus 400 may include even the laundry treatment apparatus.

The laundry data analysis apparatus 200a can acquire a plurality of laundry data for the laundry by recognizing texts and figures included in the tag image through the image recognition model.

Further, the laundry data analysis apparatus 200a can acquire additional data related to the laundry from an external server 600, etc., on the basis of the acquired plurality of laundry data.

The additional data, which are data related to characteristics not included in the tag image, may include data showing characteristics such as a kind, a bran, a selling price, a main age group, sex, and a manufacturing date. The external server 600 may be a server of the manufacturer of the laundry, various servers providing internet electronic commercial transaction services, a server providing a search service.

The laundry data analysis apparatus 200a can store laundry information including the acquired laundry data and the additional data in a database. Further, the laundry data analysis apparatus 200a can manage the laundry information for each group including at least one member.

In particular, the laundry data analysis apparatus 200a can infer member characteristic information for each of at least one member included in a specific group from a plurality of items of laundry information stored for the group. For example, the laundry data analysis apparatus 200a can infer member characteristic information for each of the at least one member by extracting or classifying a plurality of items of information in accordance with specific conditions.

For example, the member characteristic information may include data showing characteristics such as the sex, age group, size, preference brand, and preference color of each member. Further, the member characteristic information may include data related to laundry corresponding to members such as an average selling price and an average wash cycle of laundry corresponding to each member.

The laundry data analysis apparatus 200a can make an additional profit by selling the inferred member characteristic information to various companies (advertisement, marketing, clothing companies, etc.)

Depending on embodiments, the laundry data analysis apparatus 200a may provide appropriate wash guides to the members or may provide information related to setting of washing courses to the laundry treatment apparatus 500 on the basis of the member characteristic information. Accordingly, it is possible to effectively manage the laundry that belongs to each of the members.

Hereafter, various embodiments related to the laundry data analysis apparatus 200a are described with reference to FIGS. 5 to 13.

Figure 5:
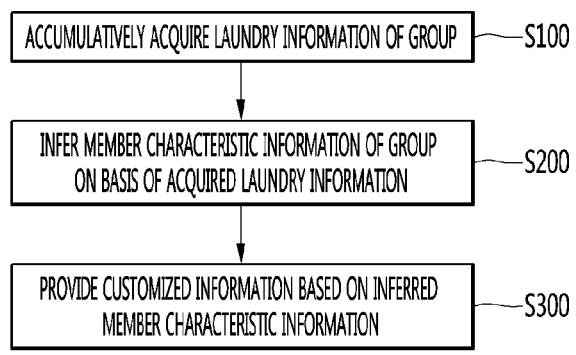
FIG. 5 is a flowchart schematically illustrating a control operation of a laundry data analysis apparatus according to an embodiment of the present invention.
Figure 6:
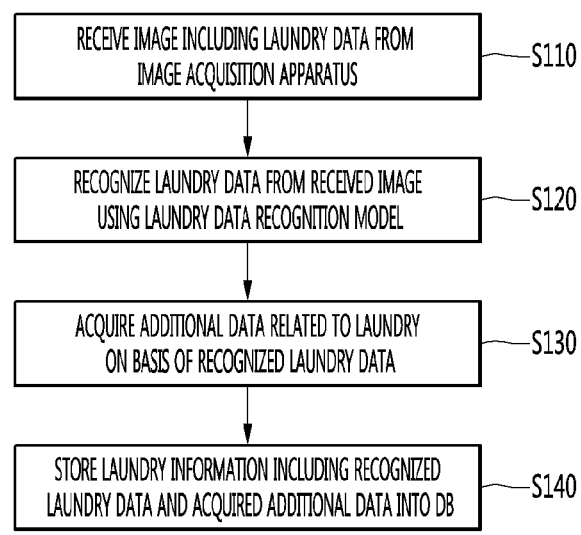
FIG. 6 is a flowchart illustrating in more detail an operation of acquiring laundry information of a laundry data analysis apparatus according to an embodiment of the present invention.
Figure 7:
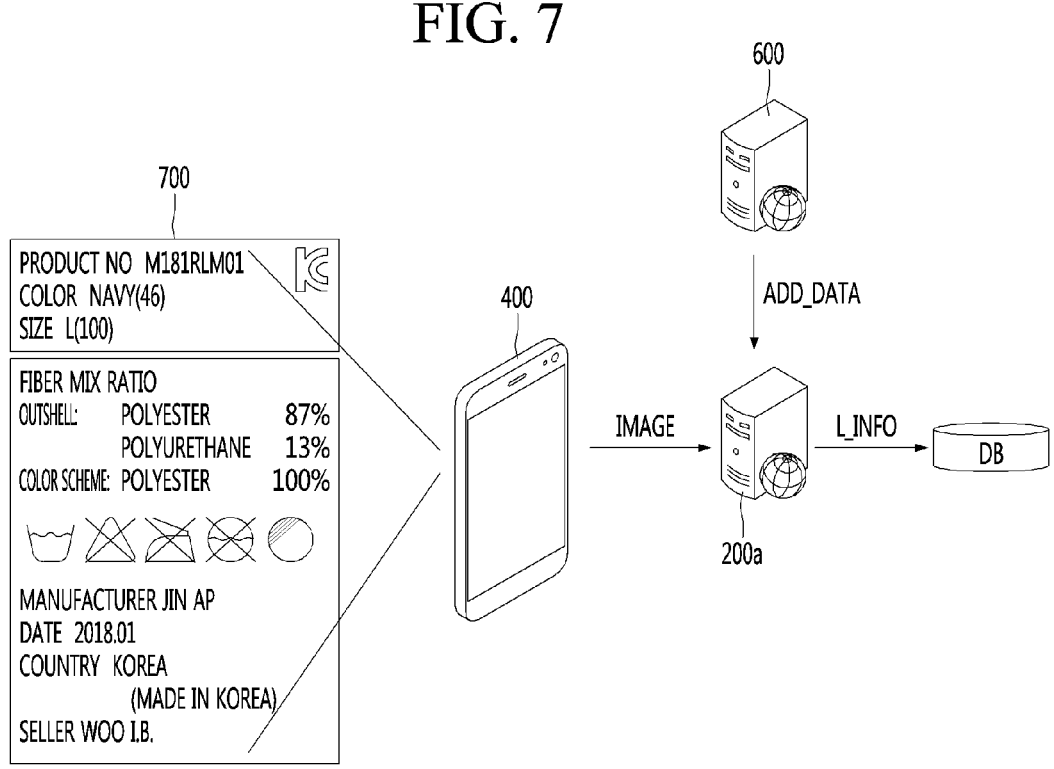
FIG. 7 is an exemplary diagram showing the operation of a system related to the embodiment of FIG. 6.
Figure 8:
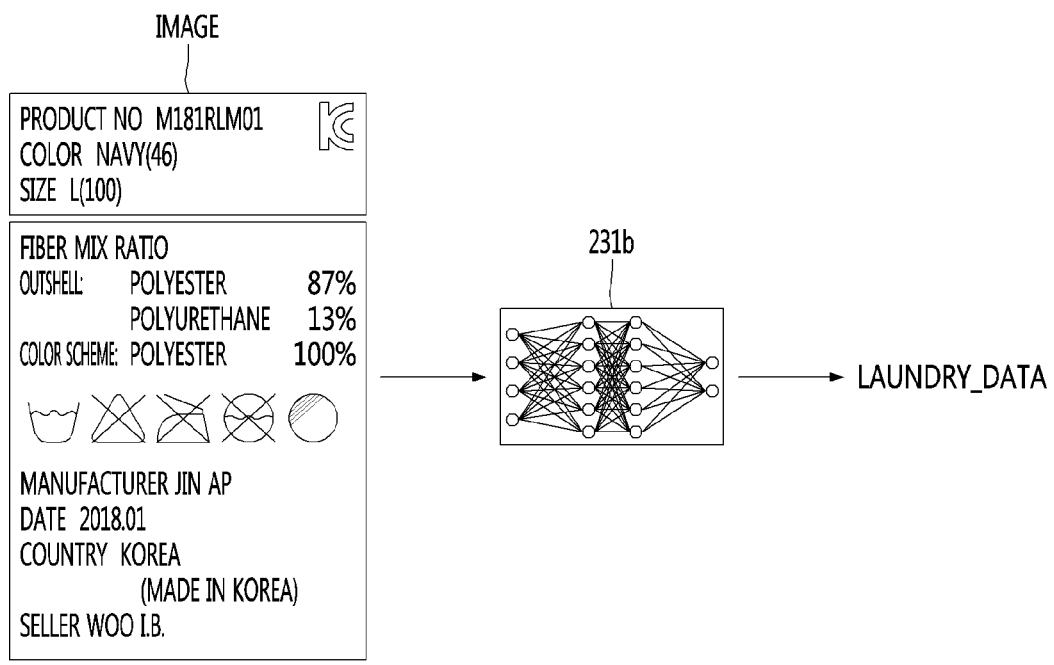
FIG. 8 is an exemplary diagram showing an operation of acquiring laundry data by recognizing an image received from an image acquisition device of a laundry data analysis apparatus.

FIG. 5 is a flowchart schematically illustrating a control operation of a laundry data analysis apparatus according to an embodiment of the present invention. FIG. 6 is a flowchart illustrating in more detail an operation of acquiring laundry information of a laundry data analysis apparatus according to an embodiment of the present invention. FIG. 7 is an exemplary diagram showing the operation of a system related to the embodiment of FIG. 6. FIG. 8 is an exemplary diagram showing an operation of acquiring laundry data by recognizing an image received from an image acquisition device of a laundry data analysis apparatus. FIG. 9 shows an example of laundry data accumulatively acquired for a specific group by a laundry data analysis apparatus. FIG. 10 shows an example of additional data that are acquired on the basis of laundry data by a laundry data analysis apparatus. FIG. 11 shows an example of member characteristic information inferred on the basis of laundry information including acquired laundry data and additional data by a laundry data analysis apparatus.

Referring to FIG. 5, the laundry data analysis apparatus 200a can accumulatively acquire laundry information of a group (S100).

Step S100 is described in more detail through FIGS. 6 to 10.

Referring to FIGS. 6 and 7, the laundry data analysis apparatus 200a can receive an image IMAGE including laundry data from the image acquisition apparatus 400 (or the laundry treatment apparatus 500) (S110).

The image acquisition apparatus 400 can acquire an image IMAGE and transmit the acquired image IMAGE to the laundry data analysis apparatus 200a on the basis of operation of a user, etc.

For example, a user can operate the image acquisition apparatus 400 to acquire an image including a tag 700 attached to laundry, for laundry to be put into the laundry treatment apparatus 500 for washing. Alternatively, the laundry treatment apparatus 500 equipped with a camera can acquire an image including a tag 700 attached to laundry to be put into the laundry treatment apparatus 500 for washing.

Laundry data related to the characteristics of laundry may be printed in texts or figures on the tag 700. For example, the laundry data included in the tag 700 may include information about the identification product number, color, size (Ho No.), material (fiber mix ratio, etc.), manufacturer name, manufacturing date, country of origin, seller name, washing method or directions for use, etc.

The laundry data analysis apparatus 200a can recognize laundry data LAUNDRY_DATA from a received image using a laundry data recognition model (image recognition model) (S120).

The laundry data recognition model 231b (e.g., an image recognition model) learned by the learning processor 240 or the processor 260 may be stored in the memory 230 of the laundry data analysis apparatus 200a.

For example, the learning processor 240 or the processor 260 can train the laundry data recognition model 231b through supervision learning that uses an image for leaning or laundry data for learning.

The processor 260 can input the received image IMAGE as input data of the laundry data recognition model 231b. The laundry data recognition model 231b can recognize laundry data LAUNDRY_DATA included in the image IMAGE on the basis of characteristic points (text, figure, etc.) included in the received image IMAGE.

Referring to the example of FIG. 9, the laundry data LAUNDRY_DATA may include data of each of a plurality of items related to the characteristics of laundry. For example, the laundry data LAUNDRY_DATA may include data respectively corresponding to the identification product number 910, cooler 920, size 930, manufacturer name 940, and material (raw matter) 950 of laundry.

Depending on embodiments, the processor 260 can further acquire data about the date 960 when each of laundry data is acquired. The data can be used to acquire information about the wash cycle of laundry.

Further, though not shown, the learning processor 240 or the processor 260 can update (learn) the laundry data recognition model 231b on the basis of the received image IMAGE and the recognition result. As the learning process is repeated, the recognition accuracy of the laundry data recognition model 231b can be improved.

The laundry data analysis apparatus 200a can acquire additional data related to laundry on the basis of the recognized laundry data LAUNDRY_DATA.

For example, the processor 260 can acquire additional data ADD_DATA related to the laundry using data corresponding to the product number 910 of the data included in the laundry data LAUNDRY_DATA For example, the processor 260 can transmit the data corresponding to the product number 910 to the external server 600 and can receive additional data ADD_DATA about laundry corresponding to the data from the external server 600. As described above, the external server 600 may be a server of a clothing distributor, an internet electronic commercial transaction service server, or a search site server, but is not limited thereto.

Depending on embodiment, when additional data ADD_DATA corresponding to the data corresponding to the product number 910 exist in the memory 230 or a database, the processor 260 may acquire the additional data ADD_DATA from the memory 230 or the database.

Referring to the example of FIG. 10, the additional data ADD_DATA may include data about the kind 1020 of laundry, a manufacturer name 1030, a brand name 1040, a selling price 1050, the age group of a user (wearer) 1060, sex 1070, and a manufacturing date (1080). Some items of the additional data ADD_DATA may overlap the laundry data LAUNDRY_DATA.

The laundry data analysis apparatus 200a can store laundry information including the recognized laundry data and the acquired additional data in a database (S140).

The processor 260 can store laundry information L_INFO including the recognized laundry data LAUNDRY_DATA and the acquired additional data in the database. The database may be included in the memory 230 or a separate apparatus connected to with the laundry data analysis apparatus 200a.

Though not shown, the laundry information L_INFO may include a plurality of data corresponding to the items 910~960 included in the laundry data LAUNDRY_DATA and the items 1010~1080 included in the additional data ADD_DATA.

Further, the processor 260 can store and manage the laundry data LAUNDRY_DATA for each group. The group may include at least one member and information corresponding to the group of the image acquisition apparatus 400 may be stored in the memory 230. The processor 260 can discriminate the group in accordance with the image acquisition apparatus 400 transmitting an image IMAGE.

FIG. 5 is described again.

The laundry data analysis apparatus 200a can infer member characteristic information of at least one member included in the group on the basis of the acquired laundry information (S200).

The processor can infer and acquire member characteristic information showing the characteristics of at least one member included in the group from laundry information L_INFO for the group accumulatively stored in the database.

In detail, the processor 260 can extract or classify the from laundry information L_INFO using at least one of a plurality of items included in the from laundry information L_INFO and can infer the member characteristic information through statistical characteristics of the extracted or classified laundry information L_INFO.

Referring to FIG. 11 in relation to this, the member characteristic information MEMBER_INFO includes information related to the characteristics of each member included in a group. For example, the member characteristic information MEMBER_INFO may include information related to the sex 1110, age group 1120, average size 1130, and preference brand 1140 of each member, an average selling price 1150 of laundry (clothing), and a wash cycle 1160.

The items are each described. The processor 260 can discriminate the members included in a group on the basis of at least one item of the size 930, age group 1060, and sex 1070 of a plurality of items of laundry information L_INFO accumulatively stored for the group. As shown in FIG. 11, the processor 260 can discriminate the members included in the group into a man of 20s to 40s, a woman of 20s to 40s, and an infant on the basis of the at least one item.

In this case, a plurality of items of laundry information corresponding to the man, a plurality of items of laundry information corresponding to the woman, and a plurality of items of laundry information corresponding to the infant may exist in the database.

The processor 260 can infer the average size 1130 of the man on the basis of size data of the plurality of laundry information corresponding to the men. The processor 260 can infer the preference brand 1140 of the man on the basis of brand data of the plurality of laundry information corresponding to the men. The processor 260 can infer the average selling price 1150 of laundry (clothing) the man on the basis of selling price data of the plurality of laundry information corresponding to the man. Further, the processor 260 can infer the average wash cycle 1160 of the man on the basis of dates when the plurality of laundry information corresponding to the man are each acquired.

Similar to the above description, the processor 260 can infer the average size 1130, preference brand 1140, average selling price 1150, and wash cycle 1160 for each of the woman and the infant.

The items 1110~1160 included in member inference information MEMBER_INFO shown in FIG. 11 are examples for the convenience of description, and the kinds and number of the items may be changed in various ways.

That is, the laundry data analysis apparatus 200*a* can not only discriminate the members of a group from a plurality of items of information for a specific group, but also infer the characteristics of each of the members. Accordingly, it is possible to effectively manage the users of the service that the laundry data analysis apparatus 200*a* provides.

FIG. 5 is described again.

The laundry data analysis apparatus 200*a* can provide customized information based on the inferred member characteristic information (S300).

For example, the laundry data analysis apparatus 200*a* can sell the inferred member characteristic information to a third person. The third person may mean various companies such as advertising, marketing, and clothing selling companies.

The third person can provide customized information to the members included in the group on the basis of the purchased member characteristic information. That is, in this case, the laundry data analysis apparatus 200*a* can provide customized information based on the inferred member characteristic information to each of the members of the group through the third person.

Alternatively, the laundry data analysis apparatus 200*a* can provide the customized information in person to each of the members of the group on the basis of the inferred member characteristic information. Alternatively, the laundry data analysis apparatus 200*a* can provide the customized information to the laundry treatment apparatus 500 corresponding to the group on the basis of the inferred member characteristic information.

Figure 12:
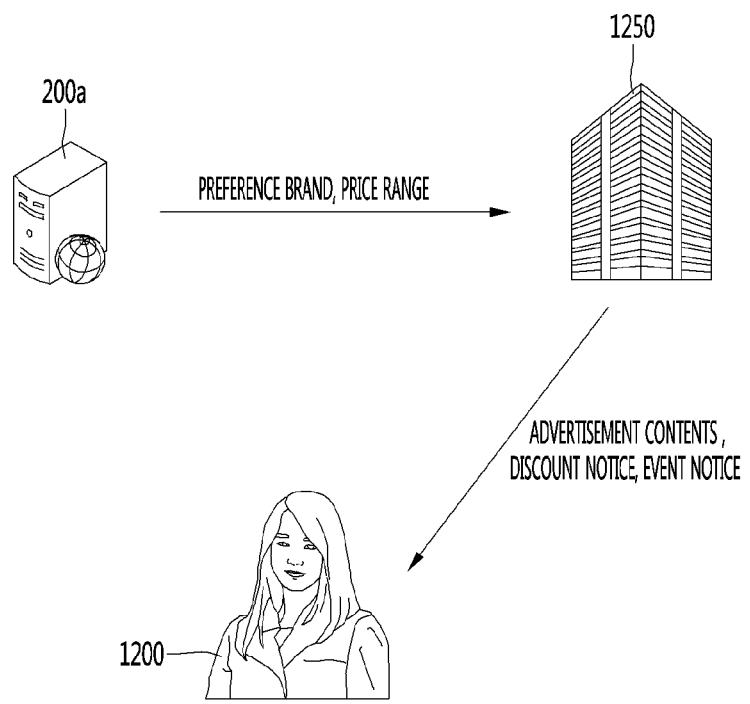
FIGS. 12 to 13 show examples that use laundry information and member characteristic information that are acquired by a laundry data analysis apparatus.
Figure 13:
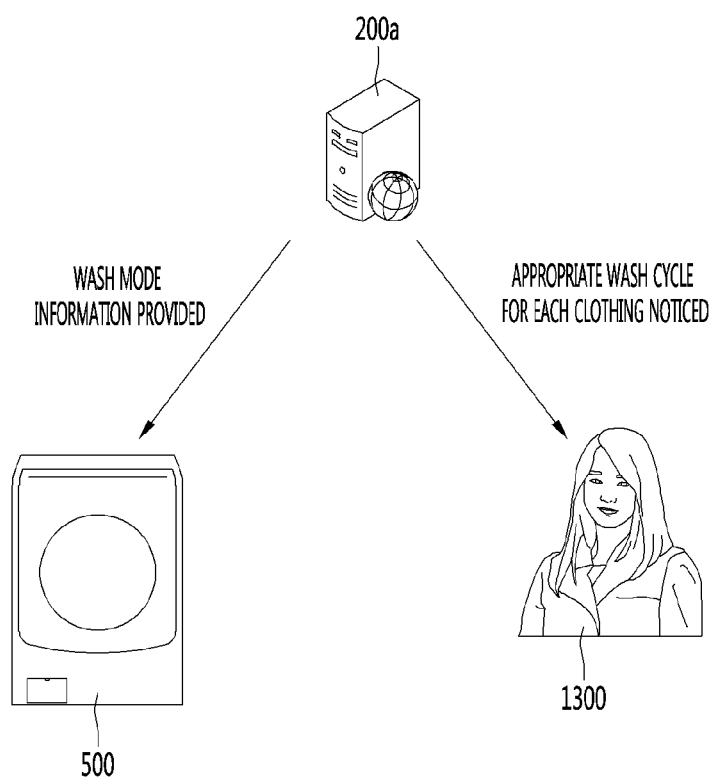

Embodiments related to this are described hereafter with reference to FIGS. 12 to 13.

FIGS. 12 to 13 show examples that use laundry information and member characteristic information that are acquired by a laundry data analysis apparatus.

Referring to FIG. 12, the processor 260 of the laundry data analysis apparatus 200*a* can acquire member characteristic information MEMBER_INFO for a member 1200 included in a group using laundry information L_INFO of the member 1200.

The laundry data analysis apparatus 200*a* can provide a preference brand and an average selling price of the acquired member characteristic information MEMBER_INFO to a clothing seller 1250. In this case, the management company of the laundry data analysis apparatus 200*a* can acquire compensation (the sales) corresponding to provision of the information from the clothing seller 1250.

The clothing seller 1250 can provide advertisement contents suitable for the member 1250 or provide a notice of discounts or events on the basis of the preference brand information and the average selling price information for the member 1200.

The member 1200 can receive only the advertisements of products of brands and prices that he/she prefers or has an interest in from the clothing seller 1250, so inconvenience due to reception of random advertisement can be solved.

That is, the laundry data analysis apparatus 200*a* makes a third person provide customized information to a user by providing acquired laundry information and member characteristic information inferred on the basis of the acquired laundry information to the third person such as a clothing seller.

Referring to FIG. 13, the processor 260 of the laundry data analysis apparatus 200*a* can acquire member characteristic information MEMBER_INFO for a member 1300 using laundry information L_INFO of the member 1300.

The processor 260 can acquire data about the manufacturing date and the wash cycle of each of laundry from the laundry information L_INFO and the member characteristic information MEMBER_INFO.

The processor 260 can determine whether the wash cycle of the member 1300 is appropriate by comparing the acquired wash cycle and the appropriate wash cycle of each of the laundry. The processor 260 can provide the determination result to the member 1300 or can inform the member 1300 of the information about an appropriate wash cycle of each of laundry (clothing). That is, the laundry data analysis apparatus 200*a* can induce the member 1300 to effectively wash and manage laundry by providing the information about the appropriate wash cycle to the member on the basis of the laundry information and the member characteristic information.

Further, the processor 260 may provide information about an appropriate wash mode (wash course) when the laundry treatment apparatus 500 corresponding to the member (or the group) washes the laundry using the data about the manufacturing date and the wash cycle of each of the laundry.

For example, when the manufacturing date of specific laundry is earlier than a reference date or a wash cycle is longer than an appropriate wash cycle, the processor 260 can provide wash course information to the laundry treatment apparatus 500 such that the laundry treatment apparatus 500 operates in a wash course (e.g., a deeply embedded strain course) stronger than a standard course when washing the laundry.

On the other hand, when the manufacturing date of specific laundry is later than a reference date or a wash cycle is shorter than an appropriate wash cycle, the processor 260 can provide wash course information to the laundry treatment apparatus 500 such that the laundry treatment apparatus 500 operates in a standard course or a wash course (e.g., an wool course) weaker than a standard course when washing the laundry.

That is, the laundry data analysis apparatus 200*a* enables effective wash and management of laundry by providing appropriate wash course information to the laundry treatment apparatus 500 on the basis of laundry information and member characteristic information about the member 1300.

According to an embodiment of the present invention, the laundry data analysis apparatus can more accurately recognize and acquire laundry information from a tag attached to laundry using learned data based on artificial intelligence such as a learning machine. Further, the laundry data analysis apparatus can repeat learning using the result of recognizing the tag, so it is possible to further improve recognition accuracy.

Further, the laundry data analysis apparatus can not only discriminate the members of a group from a plurality of items of information for a specific group, but also infer the characteristics of each of the members. Accordingly, it is possible to effectively manage the users of the service that the laundry data analysis apparatus provides.

In addition, the laundry data analysis apparatus may provide appropriate wash guides to the members or may provide information related to setting of washing courses to the laundry treatment apparatus on the basis of the member characteristic information. Accordingly, it is possible to effectively manage the laundry that belongs to each of the members.

Further, the laundry data analysis apparatus can improve satisfaction of users who use the services that the laundry data analysis apparatus provides by providing various items of customized information to members on the basis of the member characteristic information.

The above description merely explains the spirit of the present invention and the present invention may be changed and modified in various ways without departing from the spirit of the present invention by those skilled in the art.

Accordingly, the embodiments described herein are provided merely not to limit, but to explain the spirit of the present invention, and the spirit of the present invention is not limited by the embodiments.

The protective range of the present invention should be construed by the following claims and the scope and spirit of the invention should be construed as being included in the patent right of the present invention.

What is claimed is:

1. A laundry data analysis apparatus comprising:
a communication unit configured to receive an image including laundry data related to characteristics of laundry from an image acquisition apparatus corresponding to a group including at least one member; and
a processor configured to recognize the laundry data from the received image, acquire additional data related to the characteristics of the laundry based on the recognized laundry data, store laundry information including the laundry data and the additional data into a database, and acquire member characteristic information of each of the at least one member from a plurality of laundry information corresponding to the group stored in the database,
wherein the image includes a tag attached to the laundry,
wherein the processor recognizes the laundry data through at least one of a text or a figure included in the tag,
wherein the processor controls the communication unit to transmit product number information to a server if the product number information is recognized as the laundry data, and receives the additional data about laundry corresponding to the product number information from the server through the communication unit,
wherein the laundry data includes at least one of the product number information, color information, size information, material information, manufacturer information, or manufacturing date information of the laundry,
wherein the additional data includes at least one of kind information, brand information, selling price information, main age group information, sex information, or manufacturing date information of the laundry,
wherein the member characteristic information includes at least one of a preference brand, an average price, or an average wash cycle of each of the at least one member included in the group,
wherein the processor generates wash course information on the basis of manufacturing date information of laundry information corresponding to a first member included in the group and the average wash cycle information of member characteristic information of the first member, and
wherein the processor transmits the generated wash course information to a laundry treatment apparatus corresponding to the first member.

2. The laundry data analysis apparatus of claim 1, further comprising a memory configured to store a laundry data recognition model, which is trained using a machine learning or deep learning algorithm, for recognizing the laundry data from the image.

3. The laundry data analysis apparatus of claim 2, wherein the processor inputs the image received from the image acquisition apparatus as an input datum of the laundry data recognition model,
acquires the laundry data recognized from the laundry data recognition model, and
updates the laundry data recognition model on the basis of the image and the recognized laundry data.

4. The laundry data analysis apparatus of claim 1, wherein the processor classifies each of the plurality of laundry information corresponding to the group on the basis of at least one of size information, main age group information, or sex information, and
discriminates at least one member included in the group on the basis of the classification result.

5. The laundry data analysis apparatus of claim 4, wherein the processor acquires the member characteristic information including at least one of sex, an age group, or a size of each of the at least one member on the basis of laundry information corresponding to each of the discriminated at least one member.

6. The laundry data analysis apparatus of claim 1, wherein the processor infers a preference brand of each of the at least one member on the basis of the brand information of a plurality of corresponding laundry information for each of the at least one member.

7. The laundry data analysis apparatus of claim 1, wherein the processor infers an average price of laundry that each of the at least one member has on the basis of the selling price information of a plurality of corresponding laundry information, for each of the at least one member.

8. The laundry data analysis apparatus of claim 1, wherein the processor infers the average wash cycle information on the basis of a point in time when each of a plurality of corresponding laundry information is acquired, for each of the at least one member.

9. The laundry data analysis apparatus of claim 1, wherein the processor transmits the member characteristic information to an external server to provide customized information based on the member characteristic information to a member included in the group.

* * * * *